United States Patent Office 3,134,162
Patented May 26, 1964

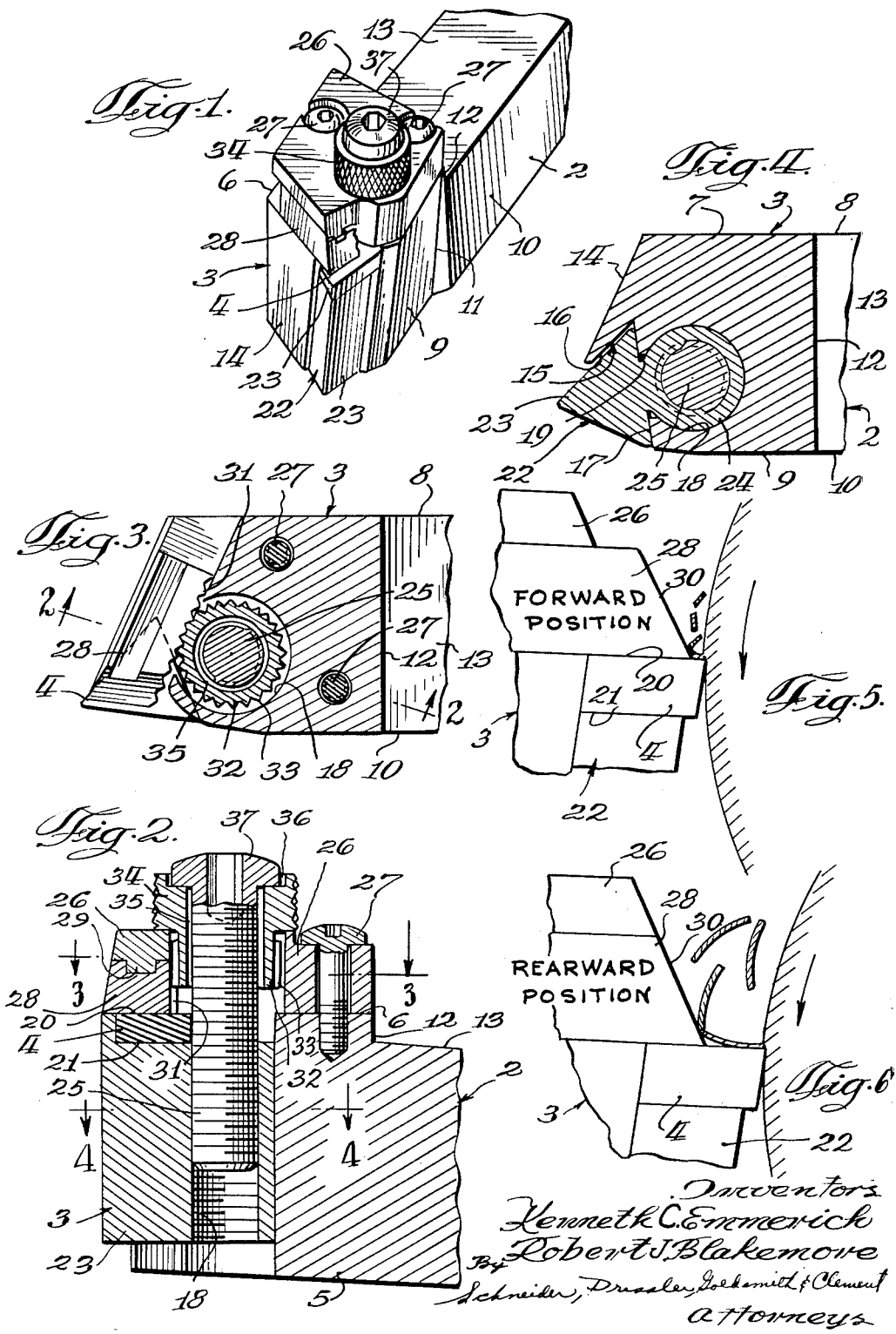

3,134,162
TOOL HOLDER
Kenneth C. Emmerich and Robert J. Blakemore, Waukegan, Ill., assignors to Fansteel Metallurgical Corporation, a corporation of New York
Filed Apr. 20, 1961, Ser. No. 104,441
2 Claims. (Cl. 29—96)

This invention relates to a tool holder for use on metal working machine, and is particularly concerned with a means for mounting a chip breaker on a conventional cutting tool to permit easy adjustment of the chip breaker relative to the cutting edge of a cutter element mounted in the tool holder.

It is well known that in cutting metals the chips of different metals break at different lengths, regardless of the size of the cut, and therefore a cutting tool may be used more efficiently if it is provided with a chip breaker properly adjusted with reference to the metal being cut. However, the proper adjustment of the chip breaker is often overlooked because of the difficulty of effecting such adjustment. The difficulties of properly adjusting the chip breaker have been compounded because of the necessity of maintaining the length and width of the head in order to permit the use of the cutter with conventional tool holders.

In those instances where there have been attempts to provide adjustable chip breakers, they have been generally unsuccessful or of limited utility because the tool holders to which they are applied have certain parts thereof which are more or less critically dimensioned for proper positioning and assembly in lathe tool brackets as well as milling and shaping heads and brackets. By the present invention, however, these difficulties are overcome and there is provided a tool holder with an adjustable chip breaker wherein the control for adjustment of the chip breaker does not interfere with full, highly versatile utilization of the tool holder in other assemblies.

The present invention contemplates means for adjusting the position of a chip breaker by a simple gear arrangement that does not require any increase in either the length or width of the head of the cutting tool, and therefore will not interfere with the use of the cutting tool clamped in a tool holder such as that shown and described in Herbert B. Clark Patent No. 2,697,272, issued December 21, 1954, and with which the cutting tool is adapted to be used. The invention will be hereinafter described with particular reference to a specific form of cutting tool, but it should be understood that the invention is not limited to the particular tool described, inasmuch as the advantages of the invention may be attained with many different types of cutting tools.

An illustrative embodiment of the invention and a structure by means of which the above noted and other advantages of the invention are attained is described in detail in the following specification, taken in conjunction with the accompanying drawings in which:

FIGURE 1 is a fragmentary perspective view of a cutting tool embodying the invention;

FIGURE 2 is an enlarged fragmentary vertical sectional view through the head of the cutting tool showing the rack and pinion gear arrangement for adjusting the chip breaker;

FIGURE 3 is a horizontal sectional view, taken along the line 3—3 of FIGURE 2;

FIGURE 4 is a horizontal sectional view, taken along the line 4—4 of FIGURE 3;

FIGURE 5 is a diagrammatic view showing the cutting tool applied to a workpiece, with the chip breaker in its forward position; and FIGURE 6 is a view, similar to FIGURE 5, with the chip breaker in its rearward position.

A cutting tool embodying the present invention is shown in the drawings as including an elongated shank 2 and a clamping head 3 comprising means for clamping a cutter element 4 with its cutting edge disposed in a predetermined position. The shank 2 may be of any desired shape, and is generally of rectangular cross section. The clamping head 3 is preferably integral with the shank and has a bottom surface 5 coplanar with the bottom of the shank. Although the cutting tool may be disposed at any angle when secured in place for a cutting operation, the surface 5 will be hereinafter referred to as the bottom surface of the clamping head regardless of the actual position occupied by it, and the opposite surface 6 will be referred to as the top surface of the clamping head.

The clamping head has one side 7 coplanar with one side 8 of the shank 2 and an opposite side 9 inclined relative to the opposite side 10 of the shank, as indicated at 11. One end 12 of the clamping head projects upwardly from the top surface 13 of the shank at an angle of approximately 90°. The opposite end 14 of the clamping head extends at an obtuse angle to the side 7 and is inclined slightly toward the end 12 in its downward direction. The top surface 6 is slightly inclined downwardly toward end 14 and toward side 9. The top surface of the cutter element is substantially coplanar with top surface 6 when the cutter element is clamped, in a manner hereinafter described, in position for a cutting operation. The angular inclinations of the various surfaces mentioned above provide proper clearance angles for the cutting operation, regardless of the position in which the cutting tool is held.

The end 14 of the clamping head has an angular recess 15 extending vertically throughout the height of the head. The recess is defined by vertical plane surfaces 16 and 17 that intersect, preferably at an angle of about 60°, along a vertical line near the surface of end 14. The clamping head 3 has a vertically disposed bore 18 that is substantially circular in cross section and intersects plane surface 17 to provide a throat 19 by means of which recess 15 and bore 18 are interconnected.

The cutter element is preferably in the form of a block having parallel top and bottom faces 20 and 21, respectively, and a triangular cross section in a plane parallel to the faces. The triangular cross section is preferably equilateral, so that the cutter element may be inserted into recess with any corner fitting against the intersecting corner between the surfaces 16 and 17 and with either surface 20 or 21 uppermost.

A lower clamping jaw 22 comprises a portion 23 of generally triangular cross section adapted to fit in recess 15, and a tubular portion 24 adapted to fit in the bore 18. The clamping jaw may be integral, or the portions 23 and 24 may be brazed or welded together. The inner surface of tubular portion 24 is threaded for reception of a screw 25. An upper clamping jaw 26 is secured in juxtaposition to top surface 6 of the clamping head 3 by screws 27. The lower portion of the jaw 26 is recessed at one edge to provide space for a chip breaker 28, the bottom surface of which is adapted to slide over the top surfaces of the cutter head and the cutter element. The upper surface of chip breaker 28 is grooved to fit a rib 29 depending from the portion of jaw 26 overlying the recess. The rib and groove may be reversed, if desired. The cross sections of the rib and groove may be of any desired configuration, but preferably corresponding to provide a smooth sliding and aligning fit.

The interengagement of the rib and groove maintains the alignment of the chip breaker so that the top and bottom edges of its front surface 30 are always parallel to the cutting edge of cutter element 4.

One side of the chip breaker is serrated to provide a rack having teeth 31. An annular pinion gear 32 encircling the screw 25 has teeth 33 meshed with teeth 31 so that rotation of said gear moves the chip breaker longitudinally, or forwardly and rearwardly relative to the cutting edge of the cutter element 4. A knurled collar 34 projects upwardly from gear 32 to facilitate rotation of the gear so that the position of the chip breaker relative to the cutter element may be adjusted easily. Clearance, indicated at 35, is provided between the outer surface of the screw 25 and the inner surface of the gear 32 and the collar 34 to insure free rotation of the gear relative to the screw.

The lower edge of the collar projects outwardly beyond the outer periphery of gear 32 to overlie the upper surface of the upper clamping jaw 26. The top of the collar is recessed, as indicated at 36, and the screw 25 has an enlarged head 37 extending over the recess 36. When the screw is loosened slightly the gear may be rotated to move the chip breaker into the desired position. When the screw is tightened, thus bringing up the lower clamping jaw 22 against the bottom of cutter element 4, the cutter element and the chip breaker are clamped between the clamping jaws 22 and 26, with the chip breaker clamped between the cutter element and the upper jaw. Tightening of the screw 25 also clamps the collar 34 between the top of clamping jaw 26 and the underside of the enlarged head 37 of the screw. The clamping action of the screw 25 prevents rotation of the gear or movement of the chip breaker.

FIGURES 5 and 6 illustrate the chip breaker and cutting tool portions of the tool holder assembly of this invention showing the chip breaker in an advanced or forward position in FIGURE 5 and in a retracted or rearward position in FIGURE 6, the same having been adjusted in the manner described above. These figures also illustrate the significance of the adjustability of the chip breaker in accordance with this invention. Some metals are such that the shavings taken therefrom during machining operations break into chips of relatively short length when such breakage is promoted by such positioning of the chip breaker with respect to the surface of the workpiece from which the shaving is being taken. Other metals are of such character that the shavings break into longer chips when the chip breaker is appropriately disposed and adjusted. Proper adjustment of the chip breaker is, therefore, very important. If the chip breaker is not properly adjusted then the shavings will not break into short lengths and will become dangerously long. Adjustment of the chip breaker embodying this invention is convenient and easy to effect indicating wide range and thereby permits safe and proper machining of the wide variety of materials without concern that the operator may be in serious physical jeopardy to flying and swirling, lengthy shavings.

Although a preferred embodiment of the invention has been described in considerable detail, it will be understood that the description thereof is intended to be illustrative, rather than restrictive, as many details of construction may be modified or changed without departing from the spirit or scope of the invention. Accordingly, we do not desire to be restricted to the exact details of construction described.

We claim:

1. A tool holder comprising a shank having a clamping head at one end thereof, an upper clamping jaw secured to said head, a lower clamping jaw, a screw extending through said upper clamping jaw and engaging said lower clamping jaw, a cutter element positioned on the top of said lower clamping jaw, said screw being operable to hold said cutter element between said clamping jaws with its cutting edge approximately parallel to one edge of said head, a chip breaker positioned between said head and said upper clamping jaw, said chip breaker having a rack formed on one side thereof, said chip breaker having a front edge parallel to the cutting edge of said cutter element, a pinion gear engaging said rack, and means for rotating said pinion gear to move said chip breaker to vary the distance between said front edge and said cutting edge.

2. A tool holder comprising a shank having a clamping head at one end thereof, an upper clamping jaw secured to said head, a lower clamping jaw, a screw extending through said upper clamping jaw and engaging said lower clamping jaw, a cutter element positioned on top of said lower clamping jaw, said screw being operable to hold said cutter element between said clamping jaws with its cutting edge approximately parallel to one edge of said head, a chip breaker positioned between said head and said upper clamping jaw, a rack on one side of said chip breaker, said chip breaker having a front edge parallel to the cutting edge of said cutter element, an annular pinion gear fitting loosely over said screw, and means for rotating said pinion gear to move said chip breaker longitudinally to vary the distance between said front edge and said cutting edge, said screw being adapted to hold said pinion gear against rotation when it is tightened to hold the cutter element.

References Cited in the file of this patent

UNITED STATES PATENTS

| 1,226,047 | Anderson | May 15, 1917 |
|---|---|---|
| 2,181,023 | Moore | Nov. 21, 1939 |
| 2,347,136 | Speckert | Apr. 18, 1944 |
| 2,697,272 | Clark | Dec. 21, 1954 |
| 2,860,402 | Proksa | Nov. 18, 1958 |

FOREIGN PATENTS

| 504,221 | Italy | Dec. 10, 1954 |
|---|---|---|
| 1,164,677 | France | May 19, 1958 |